(12) United States Patent
Chichester et al.

(10) Patent No.: US 10,114,130 B2
(45) Date of Patent: Oct. 30, 2018

(54) DETECTORS FOR USE WITH PARTICLE GENERATORS AND RELATED ASSEMBLIES, SYSTEMS AND METHODS

(71) Applicant: BATTELLE ENERGY ALLIANCE, LLC, Idaho Falls, ID (US)

(72) Inventors: David L. Chichester, Idaho Falls, ID (US); Scott J. Thompson, Ammon, ID (US); James T. Johnson, Rigby, ID (US); Scott M. Watson, Idaho Falls, ID (US); Robert S. Schley, Rigby, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 15/363,510

(22) Filed: Nov. 29, 2016

(65) Prior Publication Data

US 2018/0149761 A1 May 31, 2018

(51) Int. Cl.
*G01T 3/00* (2006.01)

(52) U.S. Cl.
CPC ..................... *G01T 3/00* (2013.01)

(58) Field of Classification Search
CPC ........... G01T 3/00; G01V 5/10; G21C 17/104
See application file for complete search history.

(56) References Cited

U.S. PATENT DOCUMENTS 3,133,195 A   5/1964  Jones et al.
3,465,148 A   9/1969  Jeter et al.
3,746,871 A * 7/1973  Kramer ................. G01V 5/101
                                                      250/269.3
4,264,823 A   4/1981  Sloughter et al.
(Continued)

FOREIGN PATENT DOCUMENTS

EP    2388624 A2   11/2011
FR    2614111 A1   10/1988
(Continued)

OTHER PUBLICATIONS

Styron ("Predicting the Sensitivity of a Beryllium/Scintillator Fusion Neutron Detector Combining Experimental Methods and Monte Carlo Models" (published Jan. 28, 2015), http://digitalrepository.unm.edu/ne_etds/41).*
(Continued)

*Primary Examiner* — Marcus Taningco
(74) *Attorney, Agent, or Firm* — TraskBritt

(57) ABSTRACT

Neutron detectors for measuring a neutron yield of a neutron generator may include at least one particle counter disposed in a housing and at least one removable cartridge for receiving at least one collection medium. The at least one removable cartridge configured to be at least partially inserted into the housing to position the collection medium proximate the at least one particle counter. Detector assemblies for evaluating an output of a particle generator may include a housing and a plurality of cartridges that may be selectively received in the housing. Methods of detecting an output of a neutron source include inserting a collection medium into a cartridge, positioning the collection medium proximate a neutron source, and inserting the cartridge with the collection medium into a housing of a neutron yield detector.

4 Claims, 3 Drawing Sheets

(56) References Cited

U.S. PATENT DOCUMENTS

| | | | | |
|---|---|---|---|---|
| 4,268,749 A | * | 5/1981 | Mills, Jr. | G01V 5/10 250/269.4 |
| 4,760,252 A | * | 7/1988 | Albats | G01V 5/04 250/266 |
| 5,313,504 A | | 5/1994 | Czirr | |
| 5,784,424 A | * | 7/1998 | Fries | G01N 23/005 250/287 |
| 6,157,034 A | * | 12/2000 | Griebel | G01N 23/222 250/358.1 |
| 6,754,586 B1 | * | 6/2004 | Adolph | G01V 5/10 702/8 |
| 7,329,872 B2 | | 2/2008 | Blackwood et al. | |
| 8,093,550 B2 | | 1/2012 | Stoller | |
| 8,526,560 B2 | * | 9/2013 | Miley | B82Y 30/00 250/424 |
| 8,594,265 B2 | | 11/2013 | Perkins et al. | |
| RE45,226 E | | 11/2014 | Odom | |
| 9,069,095 B1 | | 6/2015 | Beekman et al. | |
| 2007/0063143 A1 | | 3/2007 | Blackwood et al. | |
| 2009/0045329 A1 | | 2/2009 | Stoller | |
| 2009/0219028 A1 | | 9/2009 | Perkins et al. | |
| 2010/0025594 A1 | * | 2/2010 | Nukatsuka | G01T 3/00 250/370.11 |
| 2012/0265443 A1 | | 10/2012 | Samworth | |
| 2013/0206972 A1 | | 8/2013 | Zhou et al. | |
| 2015/0168591 A1 | | 6/2015 | Beekman et al. | |
| 2015/0323473 A1 | | 11/2015 | Mitra | |
| 2016/0139294 A1 | | 5/2016 | Groves et al. | |

FOREIGN PATENT DOCUMENTS

| | | | | |
|---|---|---|---|---|
| FR | 2697348 A1 | | 4/1994 | |
| GB | 2054917 A | | 2/1981 | |
| GB | 2001167 B | | 3/1982 | |
| GB | 2292239 B | | 7/1998 | |
| GB | 201102613 | | 3/2011 | |
| GB | 2488117 B | | 3/2013 | |
| JP | 56166455 A | * | 12/1981 | G01N 23/222 |
| JP | 2001124900 A | | 5/2001 | |
| JP | 205337764 A | | 12/2005 | |
| JP | 2009210585 A | | 9/2009 | |
| JP | 5534692 B2 | | 7/2014 | |
| WO | 8808143 A2 | | 10/1988 | |
| WO | 9622550 A2 | | 7/1996 | |
| WO | 2007035396 A2 | | 3/2007 | |
| WO | 2012012101 | | 1/2012 | |
| WO | 2015095139 A1 | | 6/2015 | |

OTHER PUBLICATIONS

Chichester et al. "Measurement of the Neutron Spectrum of a DD Electronic Neutron Generator" 21st International Conference on the Application of Accelerators in Research and Industry, INL Paper, Aug. 2010, 6 pages, Idaho National Laboratory (INL).

Heath "The Texas Convention on the Measurement of 14-MEV Neutron Fluxes From Accelerators" IDO-16888 (1964) 1 page.

Heath "Appendix to the Texas Convention on the Measurement of 14-MEV Neutron Fluxes from Accelerators" Modern Trends in Activation Analysis, Issue:1965, pp. 389-390, 4 pages.

International Union of Pure and Applied Chemistry "Recommended Procedure for the Measurement of 14-MEV Neutron Fluxes From Accelerators for Activation Analysis", Article, Pure & App/. Chem., vol. 49, 2 pages. Pergamon Press, 1977.

Jakhar et al., "Measurement of 14 MeV Neutron Flux from D-T Neutron Generator Using Activation Analysis", Article, 5 Pages, 2008 IEEE Nuclear Science Symposium Conference Record.

Mitra et al., "Monitoring Neutron Generator Output in a Mixed Neutron-Gamma Field Using a Plastic Scintillator", IEEE Nuclear Science Symposium and Medical Imaging Conference (Oct. 2007), 5 pages.

Mitra et al., "Neutron Generator Output Monitoring for Normalization of Gamma Ray Spectra", Fifth Annual Conference on Carbon Capture & Sequestration, (May 2006), 14 pages.

Murri et al. "A Method to Determine Fast and Thermal Neutron Fluxes by Foil Activation Analysis", Article Prepared under Contract for !he Albuquerque Operations Office U.S. Atomic Energy Commission, Publication Date, Mar. 12, 1971, 19 pages.

Talebitaher et al., "Beryllium neutron activation detector for pulsed DD fusion sources", Nueclear Instruments and Methods in Physics Research A 659 (Sep. 2011), pp. 361-367.

Thermo Electron Corporation "Texas Convention Technique for Measuring Neutron Output" Neutron Generators Technical Bulletin 109, Sep. 3, 2003, pp. 1-5.

* cited by examiner

DETECTORS FOR USE WITH PARTICLE GENERATORS AND RELATED ASSEMBLIES, SYSTEMS AND METHODS

STATEMENT REGARDING FEDERALLY SPONSORED RESEARCH OR DEVELOPMENT

This disclosure was made with government support under Contract No. DE-AC07-05ID14517 awarded by the United States Department of Defense. The government has certain rights in the disclosure.

TECHNICAL FIELD

Embodiments of the present disclosure are directed to methods, assemblies, systems, and devices for monitoring and/or evaluate (e.g., count) the number of particles (e.g., radiation, such as neutrons or photons) in a given area or volume that are produced by a source (e.g., a radioactive source, such as a device configured to emit neutrons). More particularly, in some embodiments, the embodiments of the present disclosure relate to detectors for measuring, or otherwise evaluating, the neutron output or yield of a neutron generator and to related assemblies, systems, and methods.

BACKGROUND

Neutron generators (NGs) or electronic neutron generators (ENGs) are widely applied in fast neutron-induced gamma-ray spectroscopy for the elemental characterization and inspection of materials, such as, for example, explosives and contraband, in the oilfield, coal, and cement industries, heavy mechanical production, radiography, nuclear security applications, art conservancy, detective work, and medicine. There is a need to monitor the yield of neutron generators in order to determine the performance of the generators. For example, since the neutrons are produced electrically, the outputs of the neutron generators may fluctuate. In such a situation, it may be desirable to monitor neutron outputs during any experimental run to normalize the gamma-ray spectra.

One method of detecting neutrons is based on their elastic scattering of incident neutrons on hydrogen-containing scintillators. This results in a recoil proton ranging in energy up to the neutron's full energy. The energy of the recoil protons is deposited in the scintillator and converted to light. Among the large variety of hydrogen-containing scintillators available, liquid scintillators and plastic scintillators are inexpensive, and therefore most often used. Although such scintillators efficiently detect neutrons, they also are sensitive to gamma rays that usually accompany the neutrons. Hence, to accurately determine the fast neutron output of the neutron generators, it is necessary to distinguish the contribution of gamma-rays from the neutron counts in the neutron detector's total response.

Another method involves the use of a foil of a pure element, such as copper, as an activation target. The foil is exposed to the neutron generators for a selected period of time during which the neutrons from the neutron generators cause nuclear transformation in atoms in the foil, producing new, short-lived, radioactive atoms. A radiation detector is then used to measure the decay of these atoms, and thus to infer the incident neutron flux to which the foil was exposed.

However, there appears to be few or no instruments that are commercially available, which are capable a monitoring the yields of neutron generators or other particle emitting generators. As a result, producers and users of neutron generators or other particle-emitting generators may be required to develop their own, ad-hoc approaches for measuring particle yields. Further, such individual solutions are generally not well documented or standardized and, as a result, it is often difficult or impossible to confidently compare yield measurements made by different producers or users.

BRIEF SUMMARY

Embodiments of the present disclosure include a neutron detector for measuring a neutron yield of a neutron generator. The neutron detector includes a housing having an opening, at least one particle counter disposed in the housing, and at least one removable cartridge for receiving at least one collection medium. The at least one removable cartridge may be configured to be at least partially inserted into the housing through the opening to position the collection medium proximate the at least one particle counter in order to evaluate the neutron yield of the neutron generator with the at least one particle counter.

Embodiments of the present disclosure include a detector assembly for evaluating an output of a particle generator. The detector assembly includes a housing having an opening, at least one particle detector in the housing, and a plurality of cartridges where each cartridge of the plurality of cartridges is configured to receive at least one collection medium. The detector assembly further includes a cartridge frame assembly configured to removably receive at least one of the plurality of cartridges within the housing and to position the at least one collection medium of the at least one cartridge relative to the at least one particle detector.

Embodiments of the present disclosure include a neutron generator system. The neutron generator system includes a neutron generator configured for directing neutrons at an object to be tested and a neutron detector for measuring a neutron yield of the neutron generator. The neutron detector may include a housing having an opening, at least one particle counter disposed in the housing, and at least one removable cartridge comprising at least one collection medium. The at least one removable cartridge may be configured to be at least partially inserted into the housing through the opening to position the collection medium proximate the at least one particle counter in order to evaluate the neutron yield of the neutron generator with the at least one particle counter.

Embodiments of the present disclosure include a method of detecting an output of a neutron source including inserting a collection medium into a cartridge for holding the collection medium, positioning the collection medium proximate a neutron source, inserting the cartridge with the collection medium into a housing of a neutron yield detector adjacent to at least one particle detector within the neutron yield detector, and determining the output of the neutron source with the at least one particle detector of the neutron yield detector.

BRIEF DESCRIPTION OF THE DRAWINGS

While the specification concludes with claims particularly pointing out and distinctly claiming that regarded as embodiments of the present disclosure, the advantages of embodiments of the disclosure may be more readily ascertained from the following description of embodiments of the disclosure when read in conjunction with the accompanying drawings in which:

DETAILED DESCRIPTION

The technology described herein relates generally to detectors that may be utilized to monitor and/or evaluate (e.g., count) the number of particles (e.g., radiation, such as neutrons or photons, or the neutron yield) in a given area or volume that are produced by a source (e.g., a radioactive source, such as a device configured to emit neutrons or photons). In some embodiments, such a detector may be utilized in assaying steady state, single-pulse, and repetitively-pulsed particle sources (e.g., an electronic neutron generator (ENG)). In some embodiments, such a detector may be configured to count the number of neutrons in one or both of a deuterium-tritium (DT) fusion reaction, which produces approximately 14.1 mega electronvolts (MeV) neutrons, and a deuterium-deuterium (DD) fusion reaction, which produces approximately 2.5 MeV neutrons. Such detectors may be implemented to evaluate a source of particles (e.g., a neutron generator) to determine the amount of neutron flux that is being emitted by the generators. As a result, such detectors may be particularly useful in evaluating neutron generators that, in addition to those applications discussed above, may be used in a variety of applications, such as, the elemental characterization and inspection of materials (e.g., nondestructive inspection of materials) in various industries, such as, for example, aerospace applications, for the nondestructive inspection of aircraft components.

The illustrations presented herein are not meant to be actual views of any particular material, device, apparatus, assembly, system, or method, but are merely idealized representations that are employed to describe embodiments of the present disclosure. Additionally, elements common between figures may retain the same numerical designation for convenience and clarity.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

As used herein, the terms "substantially" or "about" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

Figure 1:
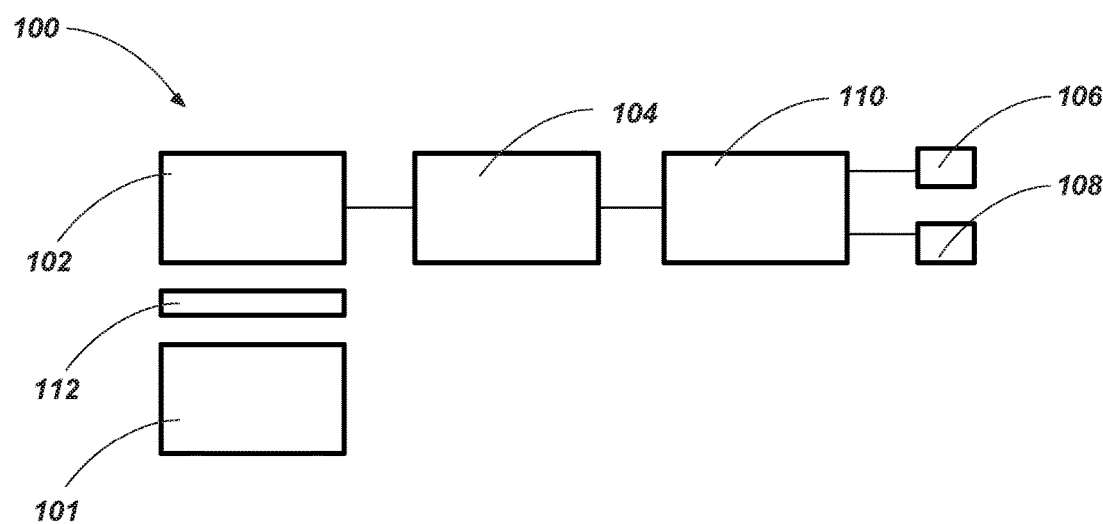
FIG. 1 is a schematic of a system including a detector and a particle generator in accordance with an embodiment of the present disclosure.

FIG. 1 is a schematic of a system including a detector 100 (e.g., a beta-gamma proportional counter) for a particle generator (e.g., a neutron generator) that includes one or more particle detectors (e.g., particle counters 102) in communication with supporting electronic components. In some embodiments, the particle counter 102 may comprise an LND Inc. Model 49727 200 cm$^2$ beta-gamma proportional counter, available from LND Inc. of Oceanside, N.Y.

The particle counters 102 may be in electrical communication with a processing device 104, such as, a signal processing preamp and/or digital signal processor (e.g., a high-voltage preamp with a digital signal processor). For example, the processing device 104 may comprise a Neuchrometer, available from Quaesta Instruments of Tucson, Ariz. The detector 100 may include a power source 106 and a data connection 108 (e.g., an Ethernet port, a wireless connection, etc.) for communication with one or more external or remote devices or systems. A switch 110 (e.g., a power over Ethernet (PoE) switch) may be positioned between the particle counter 102 and the power source 106 and the data connection 108 to pass power and/or data along Ethernet connections.

The detector 100 may include a particle collection medium 112 that is positioned proximate (e.g., adjacent, opposing) the particle counter 102. For example, the collection medium 112 may comprise a foil (e.g., a metallic foil) that is altered by the presence of one or more particles (e.g., neutron or photon). In some embodiments, the foil may comprise a radioactive isotope of a metal or alloy, such as, aluminum (Al), gold (Au), tin (Ti), copper (Cu), magnesium (Mg), silicon (Si), rhenium (Rh), indium (In), sodium (Na), or combinations thereof.

In some embodiments, the thickness of the material of the foil of the collection medium 112 may be selected to provide adequate thickness for the material to be altered on one or more sides of the material (e.g., on the front face and the back face of the material). For example, collection medium 112 may have a thickness of between 0.01 mm to 10 mm (e.g., about 1 mm).

In some embodiments, the material of the collection medium 112 may be selected to provide an assessment of particles and/or associated energy from a selected reaction. For example, the primary material of the collection medium 112 may be selected from one or more of radioactive isotopes of aluminum (Al), silicon (Si), and copper (Cu) to count or otherwise evaluate neutrons from a deuterium-tritium (DT) fusion reaction, which produces approximately 14.1-MeV neutrons. By way of further example, the primary material of the collection medium 112 may be selected from one or more of radioactive isotopes of rhenium (Rh) and indium (In) to count or otherwise evaluate neutrons from a deuterium-deuterium (DD) fusion reaction, which produces approximately 2.5-MeV neutrons.

The collection medium 112 is exposed to a source of particles (e.g., a neutron source 101, such as, a neutron generator) for a selected period of time and the particle counter 102 is used to measure the level of exposure experienced by the collection medium 112. For example, the collection medium 112 (e.g., foil) is exposed to the neutron source 101 for a period of time (e.g., a selected period of time based on the half-life of the radioactive material being emitted by the neutron source 101) during which the neutrons from the neutron source 101 cause nuclear transformation in atoms in the foil in order to producing new, short-lived, radioactive atoms. The collection medium 112 may be positioned proximate the particle counter 102 before, after, or during the exposure to the neutron source 101.

The particle counter 102 is then used to measure the decay of these atoms in order to infer the incident neutron flux to which the collection medium 112 was exposed. For example, the number (e.g., count) of neutrons in a detected given period of time is utilized to calculate the amount of neutron flux (e.g., number of neutrons travelling through a unit area in unit time) being outputted from the neutron source 101 (e.g., the yield of the neutron source 101). In some embodiments, the count of neutrons is calculated by summing the amount of neutrons detected in a given time period of a substantially full range of energy levels (e.g., in a target range of energy levels) while subtracting for background radiation. The neutron flux and ultimately the yield of the of the neutron source 101 may be calculated from a determination of the neutron count.

In some embodiment, the detector 100 and/or a related control system may be initially calibrated to a known neutron source, or more generally, a particle source, for each of the collection medium 112 (e.g., activation foils) prior to deployment to obtain a total system efficiency and to calculate a calibration factor. Such a calibration factor may be integrated over an accepted energy range of the system for particle emissions of a given decay mechanism and may take into account the self-attenuation of individual collection medium 112. Neutron flux may be calculated using the known decay parameters for each material of the collection medium 112. In some embodiments, the system may record one or more separate time periods in order to calculate the neutron flux. For example, the duration of time the collection medium 112 is bombarded with neutron irradiation, the duration or period of time between the end of neutron irradiation and the initiation of counting, and the counting duration may be utilized to calculate the neutron flux.

Figure 2:
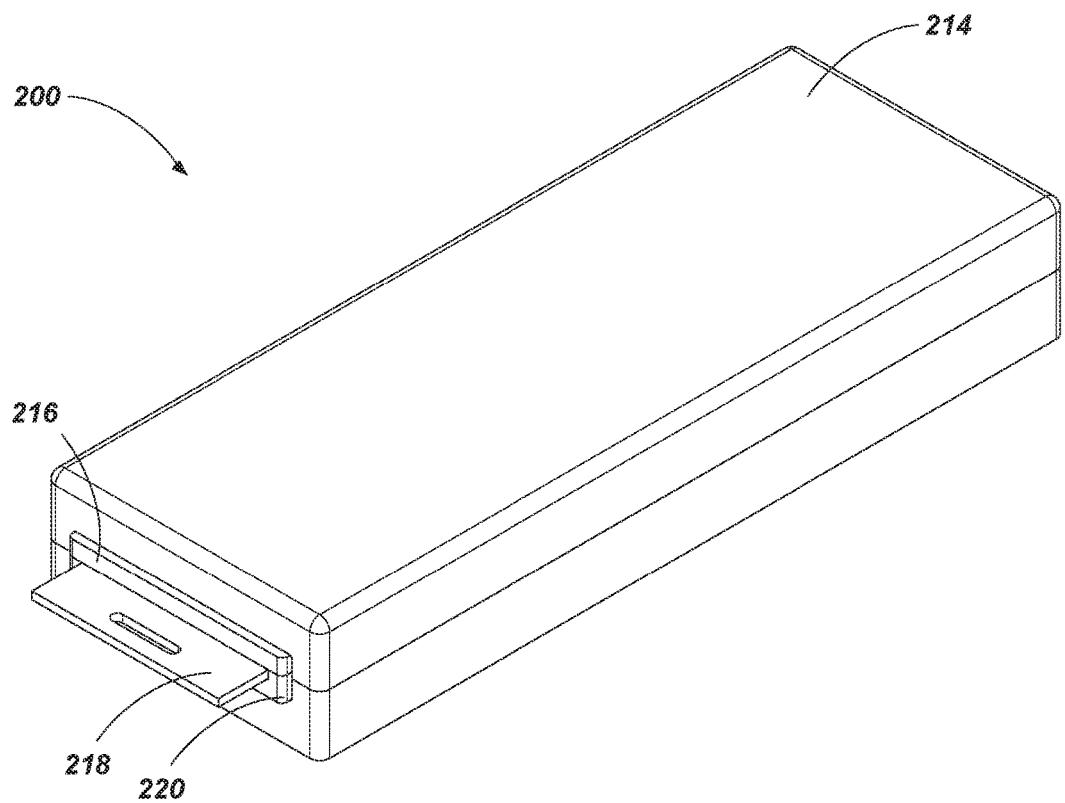
FIG. 2 is a perspective view of a detector in accordance with an embodiment of the present disclosure.

FIG. 2 is a perspective view of a detector 200 that may be substantially similar to and include similar and/or the same components as the detector 100 discussed above with reference to FIG. 1. As shown in FIG. 2, the detector 200 may include a housing 214 (e.g., case) enclosing various components of the detector 200. The housing 214 may comprise a material (e.g., a metal material, a polymer, etc.) that acts to at least partially shield components of the detector 200 (e.g., one or more particle detectors) from electromagnetic noise and other interferences. In some embodiments, the material of the housing 214 may include one or more of aluminum, steel, copper, lead, tin, antimony, tungsten, bismuth, alloys thereof, polyethylene, or combinations thereof.

The housing 214 may include an opening (e.g., at a longitudinal end of the housing 214) for receiving at least a portion of a cartridge 216 (e.g., a removable cartridge) within the housing 214. As depicted, the cartridge 216 may include a handle portion 218 extending from the housing 214 to aid in removal and installation of the cartridge 216 relative to the housing 214 and a flange portion 220 for abutting the housing 214 to position the cartridge 216 at a set location in the housing 214. In some embodiments, the cartridge 216 may comprise one or more of a metal material, a polymer material, a composite material (e.g., aluminum, an acrylic, etc.). In some embodiments, a component of the cartridge 216 (e.g., the flange portion 220) may be adjustable in order to vary the length that a portion of the cartridge 216 extends into the housing 214.

Figure 3:
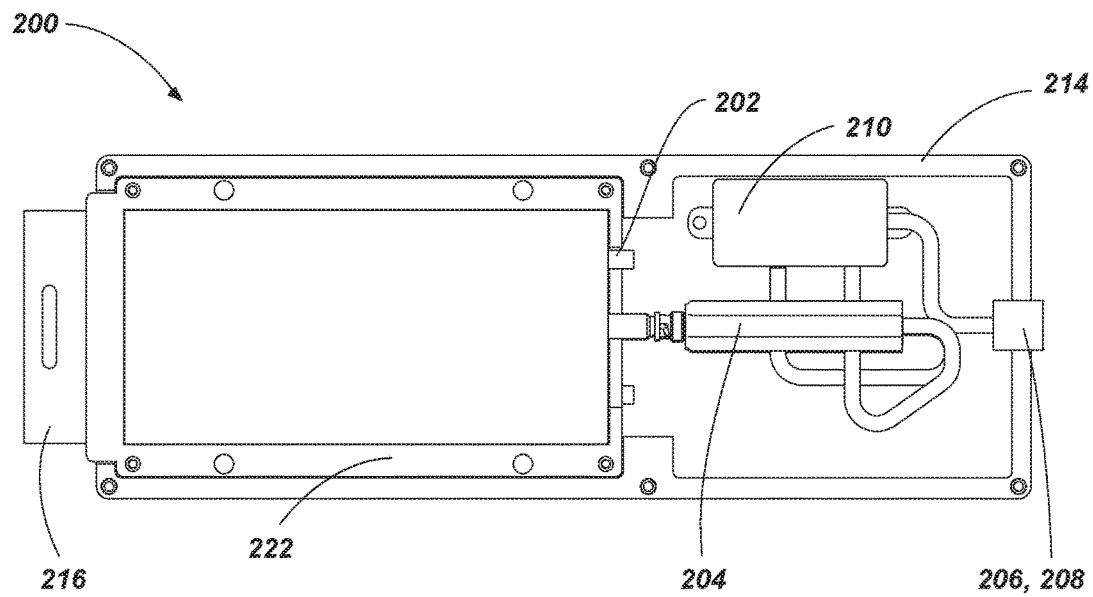
FIG. 3 is a top view of the detector shown in FIG. 2 with a portion of the housing removed.

FIG. 3 is a top view of the detector 200 shown in FIG. 2 with a portion of the housing 214 removed. As shown in FIG. 2, the detector 200 includes at least one particle counter 202 (e.g., two) and supporting electronic components, such as, a processing device 204, a power source 206, a data connection 208, and a switch 210, which may be the same or similar to the respective electronic components discussed above in relation to the detector 100 shown and described with reference to FIG. 1.

A cartridge frame assembly 222 for positioning the cartridge 216 in the housing 214 may be positioned proximate (e.g., adjacent, surrounding on one side) the particle counter 202. In some embodiments, the cartridge frame assembly 222 may comprise one or more of a metal material, a polymer material, a composite material (e.g., aluminum, an acrylic, acrylonitrile butadiene styrene (ABS), etc.). In some embodiments, one or more components of the detector 200 (e.g., one or more of the cartridge frame assembly 222 and the cartridge 216) may comprise low atomic number (low-Z) material (e.g., lightweight, low density, or combinations thereof), such as, for example, a polymer that may act to minimize the amount of neutron scattering.

In some embodiments, the cartridge 216 may releasably engage with one or more of the housing 214 or the cartridge frame assembly 222 to secure the cartridge 216 in the housing 214. For example, friction and/or a quick release mechanism (e.g., a detent and a complementary protrusion, complementary engaging protrusions, etc.) may secure the cartridge 216 in the housing 214, while enabling a user to apply a force to the cartridge 216 to remove it from the housing 214.

Figure 4:
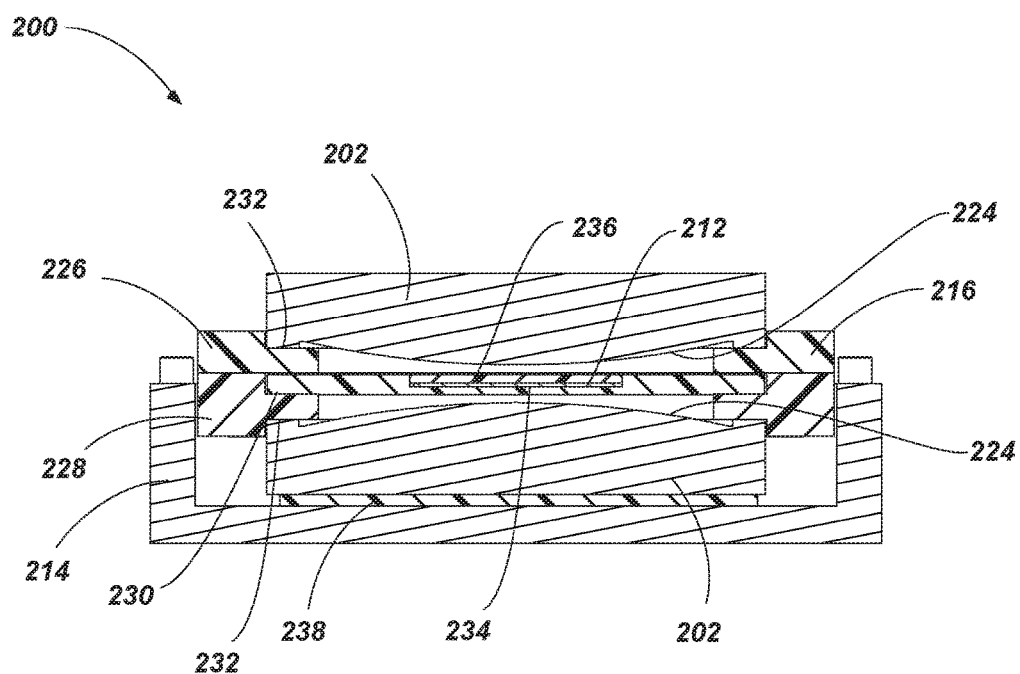
FIG. 4 is a transverse cross-sectional view of the detector shown in FIG. 2.
Figure 5:
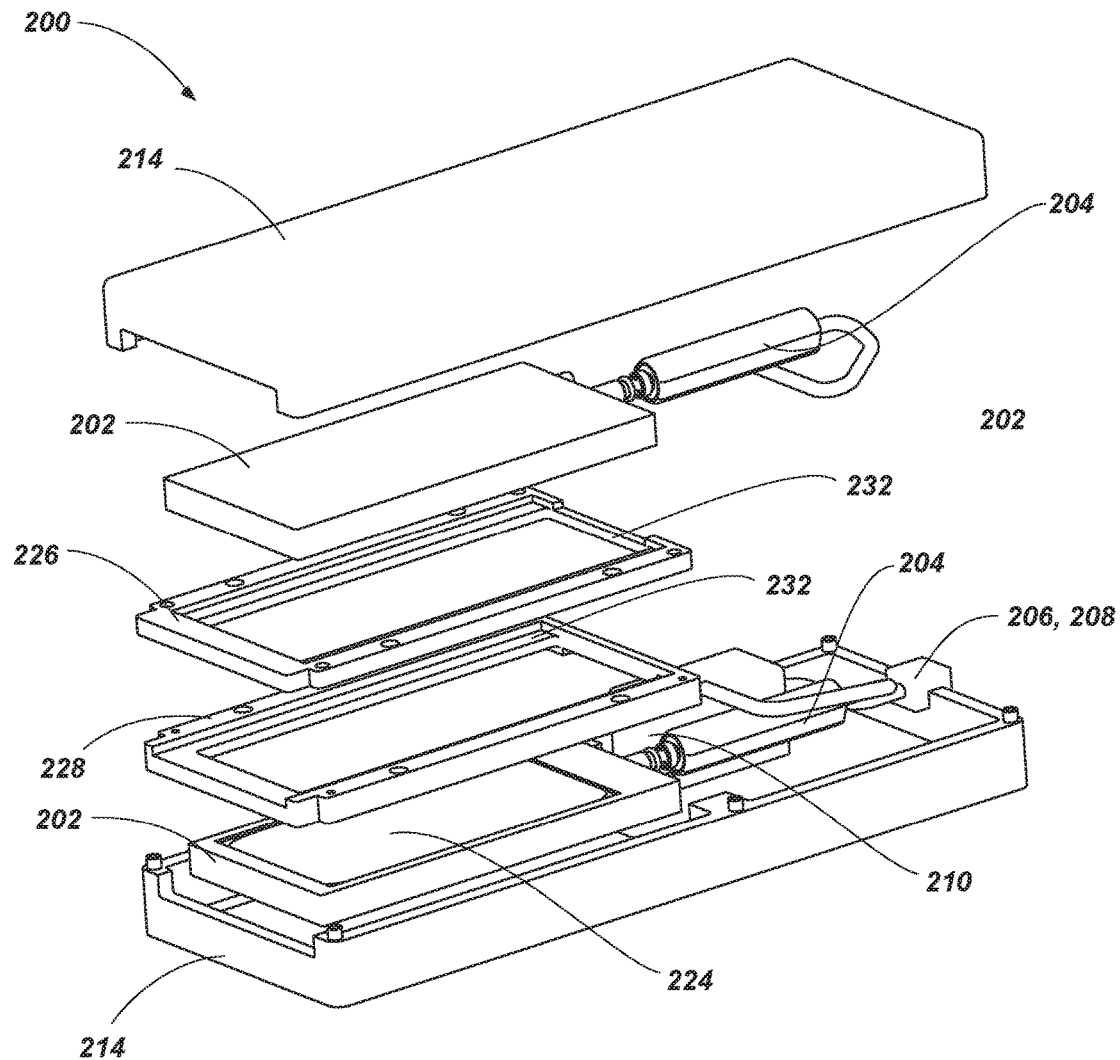
FIG. 5 is an exploded perspective view of the detector in FIG. 2.

FIG. 4 is a transverse cross-sectional view of the detector 200 shown in FIGS. 2 and 3 and FIG. 5 is an exploded perspective view of the detector 200 shown in FIGS. 2 and 3. As shown in FIGS. 4 and 5, the detector 200 may comprise two particle counters 202 positioned in the housing 214 facing one another (e.g., juxtaposing each other). For example, a sensing surface 224 (e.g., window) on a face of one of the particle counters 202 may face (e.g., be positioned in opposition to) a sensing surface 224 on a face of the other particle counter 202. In this manner, a particle counter 202 may be positioned on both sides (e.g., major faces) of the cartridge 216. In such an embodiment, the readings from each of the particle counters 202 may be compared (e.g., verified) by the readings from the other particle counter 202.

As depicted, the cartridge frame assembly 222 may be defined by a first frame 226 and a second frame 228, which may be coupled together. In other embodiments, the cartridge frame assembly 222 may have a unitary construction (e.g., formed from a single piece). The first frame 226 and second frame 228 may define a channel 230 between first frame 226 and second frame 228. The channel 230 is sized to enable the cartridge 216 to be positioned (e.g., slide) into the housing 214. The channel 230 may act to position the cartridge 216 at a select distance (e.g., a substantially equal or substantially identical distance) from each of the particle counters 202. In some embodiments, a majority or an entirety of the channel 230 may be defined in one of the frames 226, 228.

The cartridge frame assembly 222 may include a portion (e.g., a cutout portion) for receiving and positioning the particle counters 202. For example, each of the first frame 226 and the second frame 228 may include a recessed portion 232 (e.g., on a side of the frame 226, 228 opposing the channel 230).

In some embodiments, an isolative material 238 may be positioned between the particle counters 202 and the housing 214. For example, a material, such as foam, may be placed between the particle counters 202 and the housing 214 to support the particle counters 202 and isolate the particle counters 202. In some embodiments, the isolative material 238 may comprise a polymer material (e.g., polyethylene terephthalate) that is placed between the particle counters 202 and the housing 214 to isolate the particle counters 202 from the housing 214 (e.g., from interference from the metal housing 214). For example, a substantial portion of an inside of the housing may be covered with the isolative material 238 to minimize noise and/or electromagnetic interference.

As discussed above, the cartridge 216 may act to retain a collection medium 212 and enable installation of the collection medium 212 into the housing and removal of the collection medium 212 from the housing 214. For example, the cartridge 216 may include one or more openings 234 (e.g., one recessed opening) that receives the collection medium 212 (e.g., before or after being exposed to a radiation source 101 (FIG. 1). A window portion 236 of the cartridge 216 may be positioned on the collection medium 212 within the opening 234 to retain the collection medium 212. As depicted, the opening 234 and the window portion 236 may act to substantially center the collection medium 212 along the thickness of the cartridge 216 (e.g., in between the particle counters 202).

In some embodiments, the size and/or positioning of the opening 234 in the cartridge 216 may be varied based on the materials or particles to be detected with the detector 200. For example, the opening 234 may be varied for differing types of collection mediums 212, differing sizes (e.g., surface areas to be placed proximate to the sensing surface 224 of the particle counter(s) 202) of collection mediums 212, differing thicknesses of collection mediums 212, or combinations thereof. For example, a relatively larger opening 234 and a corresponding collection medium 216 may be selected where the output of a source of particles (e.g., neutron source 101 (FIG. 1)) to be monitored is relatively higher.

In some embodiments, the detector 100 may comprise an assembly including more than one cartridge 216, where at least some of the cartridges 216 are optimized for certain materials or particles to be detected or that are substantially identical for repetitive testing.

Figure 6:
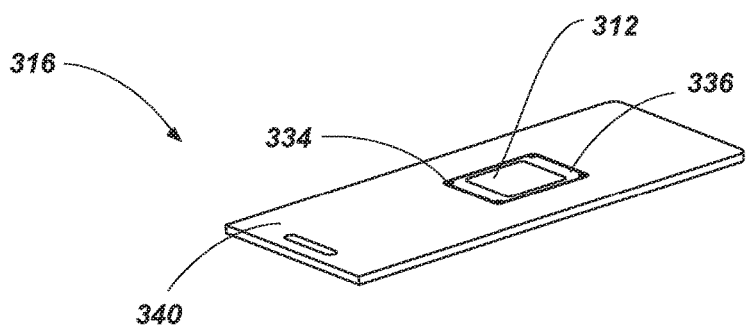
FIG. 6 is a perspective view of a cartridge for a detector in accordance with an embodiment of the present disclosure.

FIG. 6 is a perspective view of a cartridge 316 for a detector (e.g., detectors 100, 200). The cartridge 314 may be substantially similar to and include similar and/or the same components as the cartridges 112, 216 discussed above with reference to FIGS. 1 through 5. For example, cartridge 314 may include a body portion 340 having opening 334 (e.g., recessed opening) that receives a collection medium 312. A window portion 336 of the cartridge 316 may be positioned on the collection medium 312 within the opening 234 to retain the collection medium 312.

In some embodiments, a detector (e.g., detector 100, 200) may be calibrated (e.g., initially calibrated and provided with a scaling factor) by determining the yield of a source with another method (e.g., gamma spectrometry) and comparing those results with results from the detector. A scaling factor may then be assigned to the detector to normalize the output results of the detector.

In some embodiments, a detector (e.g., detector 100, 200) may be calibrated (e.g., calibrated or checked before each use of the detector) using one or more calibration cartridges, which may be the same or similar to cartridges 112, 216, 316. The calibration cartridge may contain (e.g., be preloaded with) a source of particles (e.g., radiation particles on a collection medium, such as, a foil). In some embodiments, the calibration cartridge may include at least partial shielding (e.g., beta-shielding) that inhibits a certain type or certain types of particles or waves (e.g., radiation) from the one or more particle counters (e.g., particle counters 102, 202). Such calibration cartridges may be used to verify and/or calibrate the detector by, for example, producing low-energy characteristic x-rays (e.g., for energy calibration, such as, the range and/or magnitude of the energy of interest) that are detected by the particle counters.

In some embodiments, the calibration cartridges may comprise a relatively smaller radioactive check source (e.g., as compared to particle source that is to be ultimately be tested by the detector), such as cesium-137 (Cs-137). In such an embodiment, the energy of the Cs-137 characteristic x-rays (e.g., in the 2 kilo electronvolts (keV) to 40 keV range) may be used to calibrate the energy levels (e.g., the range and/or magnitude) that are detected by the particle counters. In some embodiments, the decay emission of a source (e.g., a radioactive source, such as Cs-137), which may include one or more of x-rays and beta particles, may be utilized to verify performance of the detector (e.g., to ensure proper readings from the particle counters and output of the particle counters).

In some embodiments, and as mentioned above, calibration cartridges with or without shielding may be utilized verify performance of the detector (e.g., to ensure proper readings from the particle counters and output of the particle counters).

Embodiments of the present disclosure may be particularly useful in detectors that enable standardized and repeatable results. For example, such detectors, which can accept multiple cartridges with a collection medium, enable the use of different types of cartridges with differing types of collection mediums and/or enables multiple cartridges of substantially the same type (e.g., identical) for repeatable measurements. In some instances, different cartridges for the detector may be optimized for certain sources, such as, being optimized for either DD or DT electrical neutron generators (e.g., based on the material selected for the collection medium) and/or being optimized for the amount of yield that is expected from different sources (e.g., based on the size of the collection medium). Further, the detector employs the use of modular cartridges (e.g., with collection mediums, such a foils) that may be added or removed as needed to optimize performance for a specific source (e.g., a specific neutron generator type and level of output). The cartridge holder in the detector acts to support the cartridge in a repeatable and known orientation.

Some embodiments of the disclosure may provide a detector that is compact and that include on-board electronics for performing an analysis on a collection medium. Moreover, the use of miniaturized counting electronics directly connected to the internal detector or detectors (e.g., the particle counters) may act to minimize spurious noise signals. Finally, the use of Ethernet, or wireless communications, to communicate between the system and a remote computer may act to reduce operator radiation exposure and maximizing radiation safety for As Low As Reasonably Achievable (ALARA) standards.

While the present disclosure may be susceptible to various modifications and alternative forms, specific embodiments have been shown by way of example in the drawings and have been described in detail herein; however, it should be understood that the disclosure is not intended to be limited to the particular forms disclosed. Rather, the disclosure includes all modifications, equivalents, legal equivalents, and alternatives falling within the scope of the disclosure as defined by the following appended claims.

What is claimed is:

1. A detector assembly for evaluating an output of a particle generator, comprising:
a housing having an opening;
at least one particle detector in the housing;
a plurality of cartridges, each cartridge of the plurality of cartridges configured to receive at least one collection medium; and
a cartridge frame assembly configured to removably receive at least one cartridge of the plurality of cartridges within the housing and to position the at least one collection medium of the at least one cartridge relative to the at least one particle detector, wherein each cartridge of the plurality of cartridges comprises a window for receiving the at least one collection medium, wherein the window is configured to expose the at least one collection medium on two sides of the respective cartridge, and wherein the window of at least one cartridge of the plurality of cartridges exhibits a larger area than an area of a window of another cartridge of the plurality of cartridges.

2. The detector assembly of claim 1, wherein the window is configured to expose the at least one collection medium on two sides of the respective cartridge.

3. The detector assembly of claim 2, wherein the least one particle detector comprising two particle detectors, a first particle detector of the two particle detectors being positioned on a first side of the window of the respective cartridge and a second particle detector of the two particle detector being positioned on a second, opposing side of the window of the respective cartridge.

4. The detector assembly of claim 1, wherein at least one cartridge of the plurality of cartridges comprises at least one collection medium of a material configured to at least one of calibrate or validate operation of the at least one particle detector.

* * * * *